United States Patent

[11] 3,607,486

| [72] | Inventors | Norbie C. Jacks;<br>Jerry C. Sparks, both of Oxford, Ala. |
|---|---|---|
| [21] | Appl. No. | 820,961 |
| [22] | Filed | May 1, 1969 |
| [45] | Patented | Sept. 21, 1971 |
| [73] | Assignee | National Gypsum Company<br>Buffalo, N.Y. |

[54] PROCESS FOR MAKING WATER REPELLENT PAPER AND GYPSUM SHEATHING BOARD AND A COATING COMPOSITION USEFUL THEREIN
16 Claims, 2 Drawing Figs.

[52] U.S. Cl...................................................... 156/41,
117/158, 156/44, 162/135, 162/171, 162/173, 162/184, 162/186, 252/311.5
[51] Int. Cl...................................................... B32b 3/22,
D21h 5/00, C08h 13/00
[50] Field of Search........................................... 162/135, 171, 173, 184, 186; 117/158; 161/238; 252/311.5; 156/41, 44

[56] References Cited
UNITED STATES PATENTS

| 1,537,949 | 1925 | Kirschbraun | 162/171 |
| 1,793,810 | 1931 | Levin | 161/238 |
| 2,314,242 | 3/1943 | Porter | 252/311.5 |
| 2,620,312 | 12/1952 | Manzer | 252/311.5 |
| 2,954,302 | 9/1960 | Gorman | 156/41 |
| 2,954,313 | 9/1960 | Woodward | 162/171 |
| 3,383,271 | 5/1968 | Roberts et al. | 156/44 |

Primary Examiner—S. Leon Bashore
Assistant Examiner—Frederick Frei
Attorney—Robert F. Hause ABSTRACT: A method for making vapor permeable, water repellent paper having one surface treated with water repellent bituminous material and an opposite surface substantially free of water repellent material using a coating composition comprising an aqueous asphalt emulsion and an organic solvent with substantially all of said organic solvent being dispersed in the water phase of said emulsion.

The process of making water repellent gypsum sheathing board using sheets of cover paper as described above.

PATENTED SEP21 1971 3,607,486

INVENTORS
Norbie C. Jacks
BY Jerry C. Sparks

*Robert F. Hause*
ATTORNEY 3,607,486

PROCESS FOR MAKING WATER REPELLENT PAPER AND GYPSUM SHEATHING BOARD AND A COATING COMPOSITION USEFUL THEREIN

BACKGROUND OF THE INVENTION

Gypsum sheathing board is manufactured by disposing an aqueous slurry of gypsum plaster between two cover sheets while such components are continuously progressing along a conveyor of considerable length. The cover sheets are of a relatively heavy paper, in the order of 0.020″ thick, weighing from 60 to 80 pounds per thousand square feet.

The water-affecting characteristics desired in the cover sheets for gypsum sheathing board of an unusual character which are difficult to attain in a practical and commercially acceptable manner. To obtain the essential bond between the gypsum plaster and paper cover sheets, the paper bottom surface ply of the multiply paper sheet, commonly referred to as the bottom liner, should have substantial absorptivity relative to the water repellent top surface ply, commonly referred to as the top liner, where by the plaster slurry is absorbed into the bottom liner of the paper to form a continuous bond and keying of the subsequently hardened or set gypsum thereto. For commercially practical drying of the set gypsum core a substantial porosity of the cover sheets is essential for removal therethrough of the water or water vapor to be drawn off in the drying process.

Thus, attempts to provide, in combination with these paper cover sheet bottom liner characteristics, further characteristics of a highly water repellent opposite surface are restricted. The top liner of the paper cover sheets must be maintained in a sufficiently porous condition to permit the above discussed gypsum core drying at a practical rate. Means are therefore desired for treating generally the individual fibers or fiber groups with a highly noncontinuous water repellent top liner coating.

It is known to use bituminous materials such as asphalt as repellents for gypsum sheathing board cover paper. Highly satisfactory water repellent characteristics can be obtained for the paper form amounts of asphalt which do not substantially diminish the vapor permeability of the paper. Various methods have been suggested for applying bitumens to the paper cover sheets, which can be conventionally categorized as "wet end treatments, " i.e., the water repellent material is applied to the paper fibers prior to the time when they are interfelted into a relatively low water content, self-supporting sheet. For example, the bituminous material may be sprayed on one surface of the multi-ply paper web as the latter is being formed; or an aqueous emulsion of bituminous material may be added directly to the furnish from which the top liner ply of the multi-ply web is made.

The wet end applications of bituminous material have an inherent disadvantage for they permit a deposit of the material to continuously build up on the cylinder wires on which the paper web is formed and on the surface of the felt on which the paper web is formed and on the surface of the felt on which the paper web is picked up and carried forward. The openings between the cylinder wires and the pores of the felt thus become increasingly restricted during production and the rate of drainage of water from the paper web is reduced proportionately. Excessive water retention by the paper web can result in crushing of the fibers when the web is passed through the press roll section of the wet end and can also result in displacement of fiber positioning in the web which causes a condition conventionally known as "flowering" in the paper industry. In order to avoid these occurrences when wet end bituminous material treatments are being employed the cylinder wires and the felt must be changed more frequently than would normally be the case. Delays in production and attendant increased processing costs are encountered because of the necessity for doing so.

A method for water repellent treatment of the paper cover sheets with bituminous material at the dry end of the paper manufacturing process, i.e., after the multi-ply sheet has been formed and dried has long been sought for it would not be susceptible to the disadvantages described above. However there have not been any heretofore known commercially successful methods for applying bituminous material to paper in this manner. For example, previous attempts to apply the water repellent material to the paper as it was being passed through a calender stack resulted in "scabbing" and/or tearing of the paper due to the bituminous material sticking to the calender rolls. The vapor permeable characteristics of the paper were also adversely affected.

SUMMARY OF THE INVENTION

It is an object of the invention to provide a method of applying a water repellent coating of bituminous material to one surface of a relatively heavy paper sheet with the opposite surface of the sheet remaining substantially free of the coating. It is another object to provide such a method wherein the water repellent coating is applied to the paper sheet after it has been formed and substantially all of the water removed therefrom. It is yet another object to provide a method which will allow a highly noncontinuous coating of the water repellent material to be applied to one surface of the paper sheet without any substantial adverse effect on its vapor permeable characteristics.

It is further object of this invention to provide a water repellent treatment for gypsum sheathing board cover paper. Still further it is an object to provide a method which a water repellent coating of bituminous material can be applied to one surface of the paper at normal calender speeds to produce gypsum sheathing board cover paper of excellent quality.

It should be understood that when bituminous materials are referred to herein we means native bitumens such as asphalt and the like as well as pyrogenous asphalts, tars and pitches.

The present invention contemplates the formation of a water repellent coating composition by dispersing an organic solvent in an by emulsion of bituminous material and the application of this dispersion to one surface of a paper sheet at the dry end of the paper manufacturing process. The organic solvent and aqueous emulsion of bituminous material are blended together in a manner which allows substantially all of the former to be dispersed in the water phase of the emulsion where it acts as a lubricant to substantially prevent the bituminous material from adhering to the apparatus which are employed to apply the water repellent material to the paper. This novel method may be incorporated conveniently into the standard papermaking process by applying the water repellent coating to the paper as it is being passed through a calender stack. It has been found to be capable of highly efficient operation at calender speeds normally utilized in the papermaking process while at the same time imparting excellent water repellent properties to the paper. These and other objects of the invention will be readily apparent when considered in relation to the preferred embodiments thereof as set forth in the specification and shown in the drawings in which:

Figure 1:
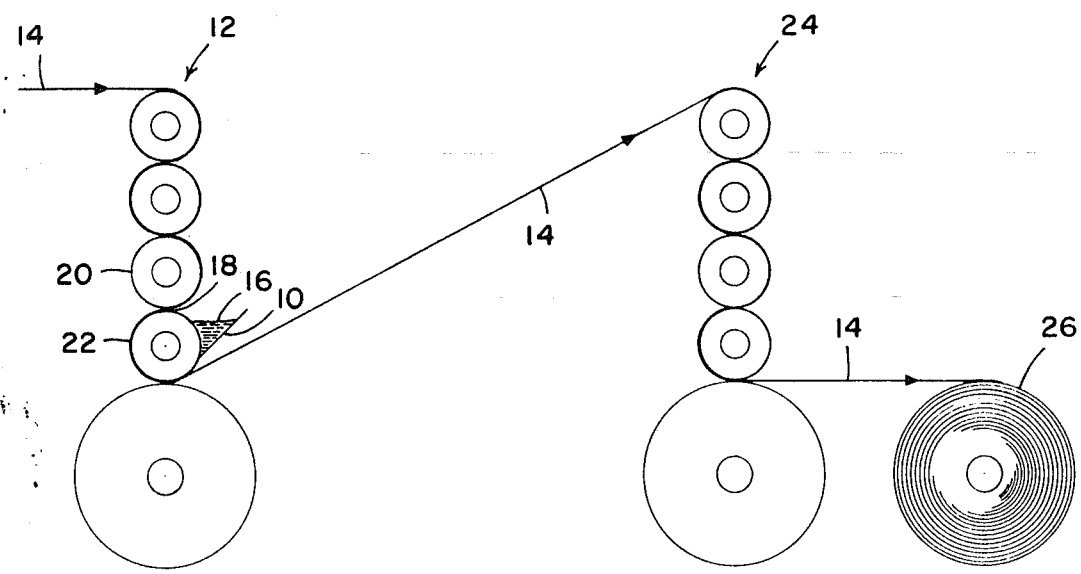
FIG. 1 is a schematic diagram of the method of making vapor permeable, water repellent paper in accordance with the invention.

The aqueous emulsions of bituminous material which is used to form the water repellent coating composition may contain up to about 65 percent by weight of bituminous material. It is preferred to use an emulsified asphalt which is identified as SS–2 throughout the petroleum industry. SS–2, an aqueous asphalt emulsion commercially available from Hunt Oil Company, contains from about 56 percent to about 64 percent by weight of asphalt and about 1 percent of emulsifying agents.

Preferably the water repellent coating composition is formed by lightly blending 7 parts by volume of SS–2 parts of the organic solvent. The process of blending these two components together must be carried out with low speed, low shear agitation at ambient temperature. For example, the two components may be brought together and blended into the desired dispersion by bubbling air slowly throughout the mixture. The method of agitation and the temperature conditions are critical for it is essential to the proper functioning of the water repellent coating method that substantially all of the organic solvent to be taken into the water phase of the emulsion and not into the asphalt phase. Should any significant part of the organic solvent content of the dispersion be taken into the asphalt phase of the emulsion the resultant dispersion will be tacky and not suitable for use according to the method of the invention. As the severity of the agitation increases and/or the temperature of the dispersion rises to any significant degree the likelihood that the organic solvent may be taken into the asphalt phase of the emulsion becomes progressively greater. The specific temperature at which this condition will occur cannot be precisely defined since its occurrence appears to be dependent upon a time-temperature relationship as well as upon temperature along.

The dispersion may be tested to determine its suitability for use by centrifuging a sample at high speed for about 30 minutes. A lightly blended dispersion will exhibit a relatively thick layer of organic solvent lying at the surface after undergoing centrifugation whereas if any significant part of the organic solvent content has passed into the asphalt phase of the emulsion the centrifuged sample will have a thick scum on the surface or a relatively thin layer of solvent lying at the surface with a thick scum immediately below it.

Prior to being applied to the surface of the paper the asphalt emulsion-organic solvent dispersion may be further diluted with water is so desired, the degree of dilution varying according to the level of water repellency required for the paper being treated. In a preferred mode of practicing the invention, wherein the paper to be treated is gypsum sheathing board cover paper, the dispersion is preferably formed by blending 7 parts by volume of SS-2 with 2 parts of organic solvent and then further diluting the dispersion with water in a volume ratio of dispersion to water 9:4. The water repellent coating composition thus formed contains from about 30 percent to about 45 percent by weight of asphalt. It has been found that excellent water repellent properties are imparted to gypsum sheathing board cover paper when about 100 pounds of the dispersion containing from about 30 percent to about 45 percent by weight of asphalt are applied to 2,000 pounds of paper.

The water repellent coating may be applied to the paper by various conventionally known techniques. Off-machine application methods such as applying the coating by means of a transfer roll, spraying or the like may be employed. In a preferred embodiment of the invention the water repellent coating is applied to the paper from a water box on a calender as the paper is passing through the calender stack in the paper manufacturing plant. This method of application is similar to that disclosed by Gorman in U.S. Pat. No. 2,954,302. Referring to FIG. 1, the asphalt emulsion-organic solvent dispersion is fed, at ambient temperature, into the water box 10 on the wet calender stack 12. As the paper web 14 is passing through the calender stack 12, the dispersion 16 is applied to the top surface of the paper web at the nip 18 through rolls 20 and 22. After the nontreated paper leaves the wet calender stack 12 it is passed through a dry calender stack 24, collected on a reel 26, cut to a desired width and stored.

The water repellent material is quite easily applied to the fibrous material in the top liner of the paper web in this manner. The coating rapidly loses substantially all of its water and organic solvent content leaving a highly water repellent coating disposed on the fibers of the top liner within a short time interval prior to being collected on the roll. The coating formed is of a relatively viscous material which was applied while the emulsion state, thus, there is substantially not subsequent penetration of the bituminous material through the paper web to the opposite face nor is there any subsequent transfer of this material to the bottom liner of the adjacent convolution in the ultimate paper roll which will appreciably appreciable affect the absorption qualities of the bottom liner. Therefore the bottom liner retains its desired water absorbent properties and the paper sheet has excellent vapor permeable characteristics.

The degree of penetration of the water repellent coating into the paper sheet maybe controlled by the sizing present in the paper and the nip pressures of the wet and dry calender stacks. It has been found that highly satisfactorily results are obtained when the paper has been hard sized with alum and rosin and the calendars are operated at the nip pressures normally used for the paper being treated. The amount of coating material taken in the paper may be controlled by the percentage of bituminous material present in the dispersion as well as by the type and amount of sizing present in the paper and the nip pressures of the calender stacks.

No. 2-D diesel fuel is preferred as the organic solvent to be blended with the aqueous emulsion of bituminous material to form the dispersion which is ultimately applied to the paper. No. 2-D diesel fuel, which has a boiling point range of from about 335° F. to about 670° F., is described in A.S.T.M. Specification D975-67 as possessing the following properties:

Minimum flash point, ° F.: 100
Maximum water and sediment by volume, percent: 0.10
Distillation temperature 90% point, ° F.: 540 min., 640 max.
Sayboldt viscosity, universal @ 100° F., sec.: 32.6 min., 42.1 max.

It should be understood that No. 2-D diesel fuel is a petroleum product of certain above-defined characteristics which have been found to be highly advantageous when used in accordance with the invention. The particular characteristics which define No. 2-D diesel fuel have been found to be the preferred characteristics desired to be employed in the method of the invention. Other organic solvents which, although not having characteristics which are in all ways similar to those of No. 2-D diesel fuel, could provide the characteristics which will permit the method of the invention to function efficiently according to the preferred embodiment thereof include aliphatic petroleum naphthas such as kerosene, mineral seal oil, mineral spirits, Stoddard solvent, No. 1-D and No. 4-D diesel fuels, No. 1 and No. 2 fuel oils, 1-GT and 1-GT gas turbine fuels, light and regular grade farm tractor oils; aromatic solvents such as SC heavy aromatic solvent, SC solvents No. 150 and No. 450; chlorinated solvents such as dichloroethyl ether, dichloroisopropyl ether, orthodichlorobenzene and trichlorobenzene; terpenes such as alpha terpineol, dipentene, solvenol No. 1, terpene solvent, terpineol No. 318, terposol No. 3, terposol No. 8, turpentine, pineoils no. 302, 302W, and 350; glycols such as ethylene glycol, diethylene glycol, triethylene glycol, propylene glycol, and dipropylene glycol; alcohols such as 2-ethyl butanol; esters such as butyl carbitol acetate, butyl cellosolve acetate, carbitol acetate and octyl (2-ethylhexyl) acetate; ketones such as acetonylacetone, diisobutyl ketone, and isophorone; ethers and ether alcohols such as butyl caritol, butyl cellosolve, carbitol, Dowanol 50-B, Dowanol 62-B and 2-ethyl butylcellosolve.

As discussed previously, the dispersion of the organic solvent in the aqueous emulsion of bituminous material must be formed and maintained at ambient temperature since any significant increase in the temperature may cause it to become tacky thus making it unsuitable for the purpose of being applied to paper in accordance with the invention to provide a water repellent coating thereon. With respect to this consideration it should be recognized that the temperature of the calender rolls with which the dispersion comes in contact while it is in the water box is in the vicinity of 150° F. when the calender is in operation. The temperature of the paper itself as it is passing through a calender stack may vary from about 120° F. to about 180° F. Thus, the dispersion will experience a temperature rise while it is in the water box due to absorption of heat from the calender rolls. This situation, of itself, will not disturb the efficient operation of the method for additional dispersion, at ambient temperature, it continuously flowing into the water box from the usage tank where it is stored. The temperature of the dispersion in the water box will therefore be presented from rising to a level which would cause the dispersion to become tacky. However, is there is an overflow pipe attached to the water box and if the overflow were to be recycled directly into the usage tank a situation which could eventually disrupt the efficient operation of the method would be created. The overflow which would be at higher than ambient temperature due to the heat absorbed from the calender rolls would eventually cause the temperature of the dispersion in the usage tank to increase. It can be seen that the dispersion coming from the usage tank would then not be able to exert a cooling effect on that which is already in the water box. Eventually this could lead to a significant temperature rise throughout the system which could destroy the effectiveness of the water repellent coating method.

This situation may be avoided by resort to various techniques. For example, the overflow can be recycled into the feed line from the usage tank to the water box where it will be mixed with fresh dispersion at ambient temperature and be colled prior to reentering the water box; or an automatic level control system could be installed in the water box to substantially eliminate any overflow. By means of such methods no overflow from the water box would be permitted to enter the usage tank and efficient operation of the method may be ensured.

The advantages of this novel process for the water repellent treatment of one surface of relatively heavy paper with less than complete through penetration of the paper to the opposite surface by the water repellent material are numerous. Production rates may be maintained at normal levels since the water repellent coating may be applied effectively at the calender speeds normally used in the papermaking process. Maintenance is kept to a minimum for, although there is a minor build up of bituminous material on the calender rolls, they can conveniently be cleaned with water. Excellent results have been achieved with this method with respect to the water repellency of the treated paper. For example, the water absorption of the coated surface of gypsum sheathing board cover paper treated by this method, as determined by T A P P I Test Method T-441 OS-63, when tested for 3 minutes at 120° F. was an average of 0.25 gram which is considered to be a highly satisfactory result. When the coated surface of the treated paper was tested according to T A P P I Test Method RC-212, a sliding drop method for determining water repellency, values of from 4 5 with an average value of 4.5 were obtained. A value of 4 or above is generally considered throughout the industry to be excellent for gypsum sheathing board cover paper.

The tests referred to above were carried out approximately 24 hours after the paper had been treated with the water repellent coating according to the preferred embodiment of the invention. A dispersion containing from about 30 percent to about 45 percent asphalt by weight was applied to the top liner of the paper from a water box on a calender stack in a ratio of approximately 100 pounds of dispersion for each 2,000 pounds of paper. Identical tests conducted immediately after the coating was applied to the paper showed significantly lesser water repellent properties for the paper. The difference is results obtained at these two different times is though to occur because substantially all of the remaining organic solvent has an opportunity to escape from the paper upon standing. Thus, tests conducted about 24 hours after the paper has been treated will be indicative of the degree of water repellency imparted to the paper.

Figure 2:
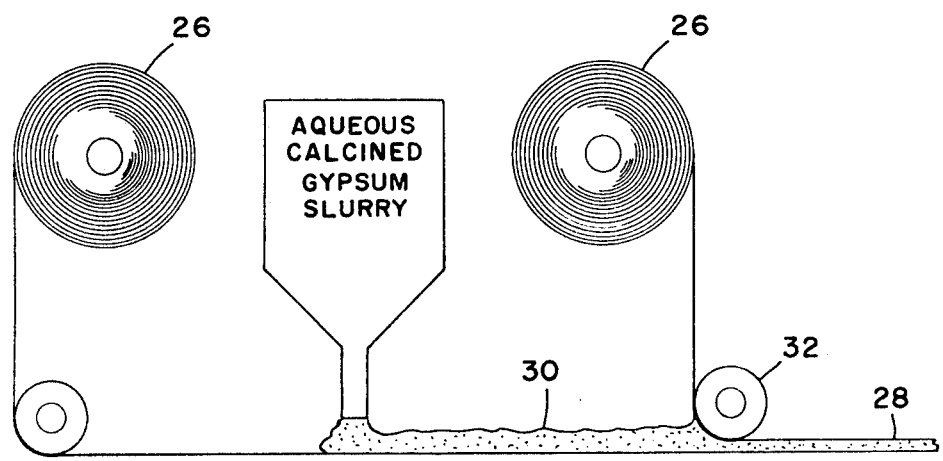
FIG. 2 is a schematic diagram of the process of making water repellent gypsum sheathing board with cover paper treated as shown in FIG. 1 in accordance with the invention.

FIG. 2 is a schematic diagram of the manufacture of gypsum sheathing board 28 from the coated paper of rolls 26 employing the usual gypsum board forming methods and equipment.

A water slurry of calcined gypsum 30 is disposed between the uncoated bottom surfaces of two-opposed water repellent paper cover sheets having on the outwardly disposed top surfaces thereof a vapor permeable coating bituminous material. The untreated and nonrepellent bottom surfaces of the cover sheets are relatively absorbent of the gypsum slurry whereby, after forming by means of a master forming roll 32 and subsequent setting and drying of the paper covered gypsum sheathing board, a highly satisfactory gypsum to paper bond is obtained thus providing an improved water repellent gypsum sheathing.

Having given a detailed disclosure of the preferred embodiments of the invention so that those skilled in the art may practice the same we contemplate that variations may be made without departing from the essence of the invention or the scope of the appended claims.

WHAT WE CLAIM IS:

1. The method of making a relatively thick vapor permeable paper sheet with a bituminous water repellent treatment on one face comprising the steps of combining an organic solvent with an aqueous emulsion of bituminous material to form a composition with substantially all of said organic solvent being dispersed within the water phase of said emulsion, applying said composition while at about ambient temperature to only one surface of a paper sheet of at least about 0.020" thickness with less than complete through penetration of said paper sheet by said composition, said composition having a sufficient proportion of bituminous material to produce water repellency on said paper and a sufficient proportion of organic solvent to substantially reduce the amount of bituminous material which adheres to the application apparatus, and drying said paper sheet whereby a water repellent surface is formed on one side without creating water repellency on the opposite surface surface and without substantial lessening of the vapor permeability of the paper.

2. The method of claim 1 in which said organic solvent has a boiling point in the range of from about 335° F. to about 670° F.

3. The method of claim 1 in which said organic solvent is No. 2-D diesel fuel.

4. The method of claim 1 in which said aqueous emulsion of bituminous material contains from about 56 percent to about 64 percent by weight of asphalt.

5. The method of claim 1 in which said composition is formed by blending together No. 2-D diesel fuel and an aqueous asphalt emulsion containing from about 56 percent to about 64 percent by weight of asphalt in a volume ratio of diesel fuel to asphalt emulsion of about 2:7.

6. The method of claim 1 in which said composition contains from about 30 percent to about 45 percent by weight of bituminous material and is applied to said paper sheet at a paper temperature of from about 120° F. to about 180° F. in a weight ratio of composition to paper of about 1:20.

7. The process of making water repellent gypsum sheathing board comprising the steps of combining an organic solvent with an aqueous emulsion of bituminous material to form a composition with substantially all of said organic solvent being dispersed within the water phase of said emulsion, applying said composition while at about ambient temperature to only one surface of a relatively heavy paper sheet having a thickness of at least about 0.020" with less than complete through penetration of said paper sheet by said composition, said composition having sufficient proportion of bituminous material to produce water-repellency on said paper and a sufficient proportion of organic solvent to substantially reduce the amount of bituminous material which adheres to the application apparatus, drying said paper sheet whereby a water repellent surface is formed on one side without creating water repellency on the opposite surface ad without subs' intially lessening of the vapor permeability of the paper, subsequently depositing an aqueous slurry of calcined gypsum adjacent the uncoated surface of said paper, disposing an additional sheet of said paper over said calcined gypsum slurry with the uncoated surface of said additional paper sheet adjacent said slurry and then forming a gypsum board therefrom whereby said gypsum hardens and bonds to said uncoated paper surfaces to provide a strong water repellent board.

8. The process of claim 7 in which said organic solvent has a boiling point in the range of from about 335° F. to about 670° F.

9. The process of claim 7 in which said organic solvent is No. 2-D diesel fuel.

10. The process of claim 7 in which said aqueous emulsion of bituminous material contains from about 56 percent to about 64 percent by weight of asphalt.

11. The process of claim 7 in which said composition is formed by blending together No. 2-D diesel fuel and an aqueous asphalt emulsion containing from about 56 percent to about 64 percent by weight of asphalt in a volume ratio of diesel fuel to asphalt emulsion of about 2:7.

12. The process of claim 7 in which said composition contains from about 30 percent to about 45 percent by weight of bituminous material and is applied to said paper sheet at a paper temperature of from about 120° to about 180° F. in a weight ratio of composition to paper of about 1:20.

13. A water repellent coating composition which is formed by blending together an organic solvent and an aqueous asphalt emulsion containing from about 56 percent to about 64 percent by weight of asphalt in a volume ratio of organic solvent to asphalt emulsion of about 2:7, so that substantially all of said organic solvent is dispersed in the water phase of said emulsion.

14. The composition as defined in claim 13 wherein said organic solvent has a boiling point in the range of from about 335° to about 670° F.

15. The composition as defined in claim 13 wherein said organic solvent is No. 2-D diesel fuel.

16. The composition as defined in claim 13 wherein the asphalt content is from about 30 percent to about 45 percent by weight of said composition.

PO-1050
(5/69)

UNITED STATES PATENT OFFICE
CERTIFICATE OF CORRECTION

Patent No. 3,607,486      Dated September 21, 1971

Inventor(s) Norbie C. Jacks and Jerry C. Sparks

It is certified that error appears in the above-identified patent and that said Letters Patent are hereby corrected as shown below:

Column 1, line 18, "multiply" should be - -multi-ply- -;
same column, line 21, "where by" should be - -whereby- -;
same column, line 57, the phrase, "the paper web is formed and on the surface of the felt on which", which is repetitive, should be deleted.

Column 2, line 38, "by" should be - -aqueous- -; same column, line 64, "emulsions" should be - -emulsion- -; same column, line 74, after "SS-2" the words - -with 2- - should be inserted.

Column 3, line 63, "nontreated" should be - -now-treated- -.

Column 4, line 3, the word "appreciable" should be deleted; same column, line 8, "maybe" should be - -may be- -; same column, line 10, "satisfactorily" should be - -satisfactory- -; same column, line 61, "caritol" should be - -carbitol- -.

Column 5, line 5, "it" should be - -is- -; same column, line 8, "presented" should be - -prevented- -; same column, line 9, "is" (first occurrence) should be - -if- -; same column, line 27, "colled" should be - -cooled- -; same column, line 53, "4 5" (first occurrence) should be - -4 to 5- -; same column, line 67, "though" should be - -thought- -.

Column 6, line 4, "of" should be inserted between "coating" and "bituminous"; same column, line 35, the word "surface" (second occurrence) should be deleted; same column, line 71, "ad" should be - -and- -.

Signed and sealed this 21st day of March 1972.

(SEAL)
Attest:

EDWARD M. FLETCHER, JR.
Attesting Officer

ROBERT GOTTSCHALK
Commissioner of Patents